(No Model.)
N. MAXFIELD, R. F. GRIFFIN & H. A. SPEER.
CULTIVATOR.
No. 523,080.  Patented July 17, 1894.
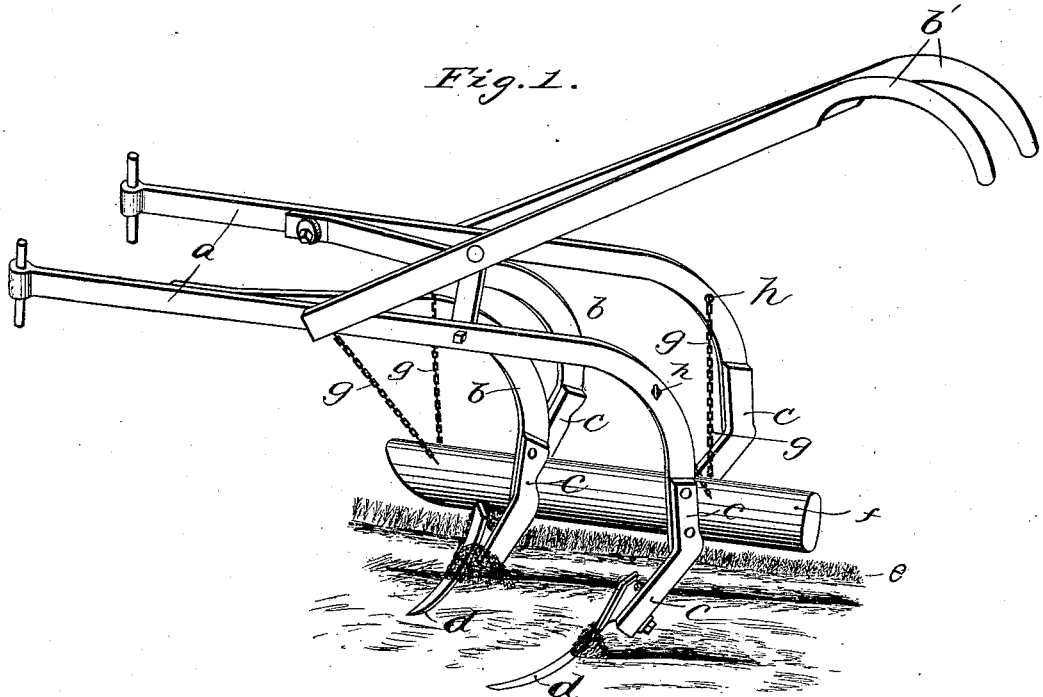
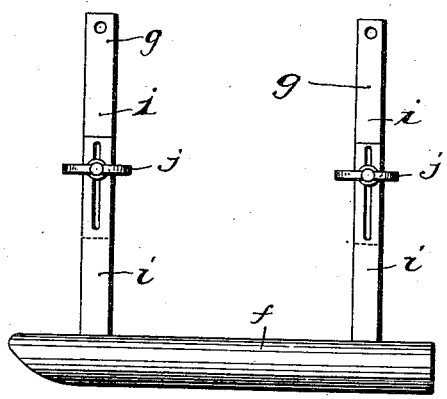
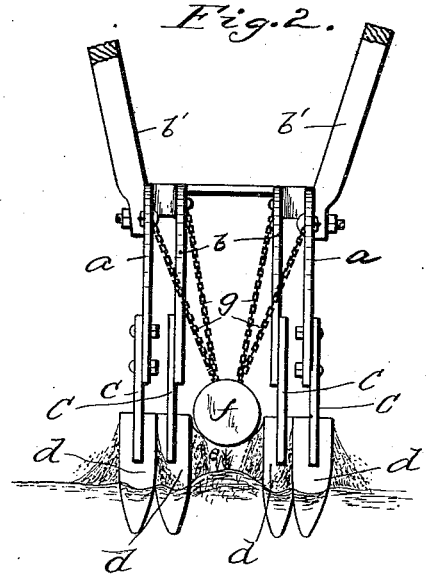

UNITED STATES PATENT OFFICE.

NELSON MAXFIELD, RICHARD FRANKLING GRIFFIN, AND HENRY ALSON SPEER, OF RIENZI, TEXAS.

CULTIVATOR.

SPECIFICATION forming part of Letters Patent No. 523,080, dated July 17, 1894.

Application filed November 4, 1893. Serial No. 490,044. (No model.)

*To all whom it may concern:*

Be it known that we, NELSON MAXFIELD, RICHARD FRANKLING GRIFFIN, and HENRY ALSON SPEER, citizens of the United States of America, residing at Rienzi, in the county of Hill and State of Texas, have invented certain new and useful Improvements in Cultivators; and we do hereby declare the following to be a full, clear, and exact description of the invention, such as will enable others skilled in the art to which it appertains to make and use the same.

Our invention has relation to "cultivators;" and is a guard to protect the young growing crop from being covered by dirt when it is being cultivated.

Our guard is intended primarily to be applied to the "duplex cultivator," manufactured by the "David Bradley Manufacturing Company," Chicago, Illinois, but it may be applied to any plow or cultivator where such plow or cultivator is so constructed that our guard may be practically attached thereto.

In the accompanying drawings: Figure 1 is a perspective view of the rear part of the "duplex cultivator," with our guard attached thereto; over the row of the young growing crop, but inside of the plow points. This guard is suspended by chains. Fig. 2 is a rear end view of our invention. Fig. 3 is a perspective view of our guard and its adjustable hangers.

Our invention is described as follows:

In the accompanying drawings: $a, a$, represent the outer drag bars; $b, b$, the inner drag bars; $c, c, c, c$, the standards and $d, d, d, d$, the plow points; $e$, represents the row of the young growing crop; $f$, represents the guard, and $g, g, g, g$, the hangers, and $b', b'$, the handles. The lower ends of said hangers $g, g, g, g$, are secured one at each end of the guard and the upper ends thereof are secured to the inner faces of the drag bars $a$, and $b$, so that it will hang over the row and between the plow points $d$.

It will be seen that both sides of the row are cultivated at the same time and that dirt is thrown to either side of the crop simultaneously, and when the crop is small and tender it is liable to be injured and sometimes covered up by too much dirt, rough dirt or clods, tussocks, trash or the like falling over on to the young crop. In order to prevent this our guard was invented, and in practice it is raised high enough above the surface of the ground to allow the fine dirt to fall in under the guard around the roots of the crop, while the rough dirt, clods, tussocks, trash or the like is thrown back into the furrow cut by the front plow points and is there covered up by the rear plow points.

This guard may be suspended higher or lower according to the size of the crop and the amount of dirt desired to be thrown around its roots, and for this purpose the hangers are made adjustable by their upper ends being hooked to the drag bars as shown at $h$, it not being convenient to show the hooks which secure the front hangers to the drag bars we have not attempted to do so, as the manner of securing them to said drag bars is not material only if they be adjustable.

The hangers as shown in Fig. 3 consist of slotted strips $i, i$, and thumb screws $j, j$.

The guard may be made of wood, tin, or any other material and may be varied in size and length to suit the plow or cultivator to which it is attached.

Having described our invention, what we claim as new, and desire to secure by Letters Patent, is—

1. In combination with a cultivator, substantially as shown and described, the combination of the long cylindrical guard $f$, having its lower face at its front end inclined upwardly, suspended between the plow points, and the adjustable hangers $g$, having their upper ends adjustably secured to the drag bars $b$, substantially as shown and described and for the purposes set forth.

2. In combination with a cultivator, substantially as shown and described, the combination of the long cylindrical guard $f$, having its lower face at its front end inclined upwardly, suspended between the plow points, and the adjustable hangers $g$, consisting of the slotted bars $i$, and the thumb-screws $j$, substantially as shown and described and for the purposes set forth.

In testimony whereof we affix our signatures in presence of two witnesses.

NELSON MAXFIELD.
RICHARD FRANKLING GRIFFIN.
HENRY ALSON SPEER.

Witnesses:
G. D. TARLTON,
J. W. MILLER.